United States Patent [19]

Nishimura

[11] Patent Number: 4,464,731
[45] Date of Patent: Aug. 7, 1984

[54] VARIABLE RETRIEVAL SPEED/DIRECTION ELECTRONIC TRANSLATOR

[75] Inventor: Kosuke Nishimura, Yamatokoriyama, Japan

[73] Assignee: Sharp Kabushiki Kaisha, Osaka, Japan

[21] Appl. No.: 326,710

[22] Filed: Dec. 2, 1981

[30] Foreign Application Priority Data

Dec. 9, 1980 [JP] Japan ............................ 55-174403

[51] Int. Cl.$^3$ ............................................. G06F 15/38
[52] U.S. Cl. .................................... 364/900; 364/419
[58] Field of Search ............. 364/200, 900, 419; 434/156

[56] References Cited

U.S. PATENT DOCUMENTS

| 4,218,760 | 8/1980 | Levy | 364/900 |
| 4,373,192 | 2/1983 | Yanagiuchi et al. | 364/900 |
| 4,381,551 | 4/1983 | Kanou et al. | 364/900 |
| 4,383,306 | 5/1983 | Morimoto et al. | 364/900 |
| 4,393,460 | 7/1983 | Masuzawa et al. | 364/900 |
| 4,393,462 | 7/1983 | Tanimoto et al. | 364/900 |

Primary Examiner—Jerry Smith
Assistant Examiner—Mark P. Watson
Attorney, Agent, or Firm—Birch, Stewart, Kolasch & Birch

[57] ABSTRACT

An electronic translator is disclosed wherein a first word or words represented in a first language are entered to obtain a second word or words represented in a second language equivalent to the first word or words. The translator comprises an input circuit for entering the first word or words, a memory circuit for storing the second word or words, an access circuit for addressing the memory to cause retrieval of the second word or words, a retrieval control circuit for selecting the retrieval speed of the access means and an indicating circuit responsive to the access circuit for indicating the second word or words.

20 Claims, 5 Drawing Figures

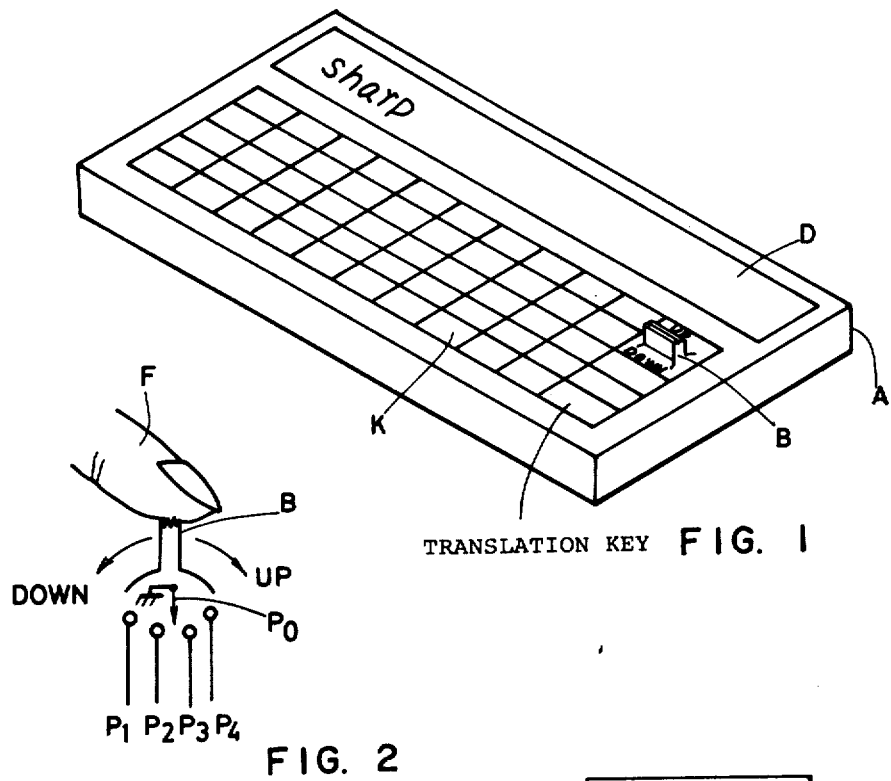
FIG. 1
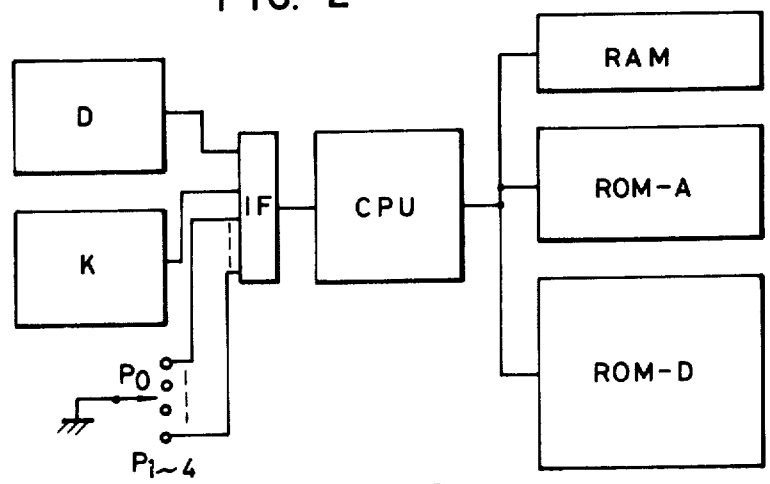
FIG. 2
FIG. 3

| search | code | word | |
|--------|------|------|---|
| P₂ | 101 | label | 札⋯⋯ |
| P₂ | 102 | labial | くちびるの⋯ |
| P₁ | 103 | labor | 労働⋯ |
| P₁ | 113 | lace | レース⋯ |
| P₁ | 123 | lad | 若者⋯ |
| P₁ | 153 | legend | 伝説⋯ |
| P₃ | 152 | legate | 使節⋯ |
| P₃ | 151 | legal | 法律の⋯ |

VARIABLE RETRIEVAL SPEED/DIRECTION ELECTRONIC TRANSLATOR

BACKGROUND OF THE INVENTION

The present invention relates in general to a word information storage and retrieval device and, more particularly, to an electronic translator for providing efficient and rapid retrieval of any desired word or words stored therein.

Recently, a new type of electronic device called an electronic translator has been available on the market. The electronic translator differs from any conventional type of electronic device in that the former is of a unique structure which provides for efficient and rapid retrieval of word information stored in a memory.

To retrieve the word information from or search the word information in the memory, a desired source word must be entered into the electronic translator. However, as it is customary to enter the desired source word by actuating a keyboard means, the entry of the source word can take a long time since the operator may not be sure of the spelling of the source word or the spelling of the source word may be long even if he is sure of the spelling.

In such a case, it is desired that even when the entry of the source word takes a longer time, the retrieval or the search can be operated in such a short time as in the case where the entered word is short.

SUMMARY OF THE INVENTION

Accordingly, it is an object of the present invention to provide an improved electronic translator for changing the speed at which word information is retrieved from a memory.

It is another object of the present invention to provide an improved electronic translator for retrieving word information from a memory at either a rapid speed or a slow one. Briefly described, in accordance with the present invention, an electronic translator, wherein a first word or words represented in a first language are entered to obtain a second word or words represented in a second language equivalent to the first word or words, comprises input means for entering the first word or words, memory means for storing the second word or words, access means provided for addressing the memory means to cause retrieval of the second word or words, retrieval control means for selecting a retrieval speed of the access means, and indicating means responsive to the access means for indicating the second word or words.

BRIEF DESCRIPTION OF THE DRAWING

The present invention will become more fully understood from the detailed description given hereinbelow and the accompanying drawing which is given by way of illustration only, and thus is not limitative of the present invention and wherein:

FIG. 1 shows a perspective view of an electronic translator according to the present invention;

FIG. 2 shows a schematic view indicating the operation of a search switch of the present invention;

FIG. 3 shows a block diagram of a control circuit implemented within the electronic translator;

FIG. 5 shows a table representing an example of the retrieval operation of the present invention.

DESCRIPTION OF THE INVENTION

Figure 4:
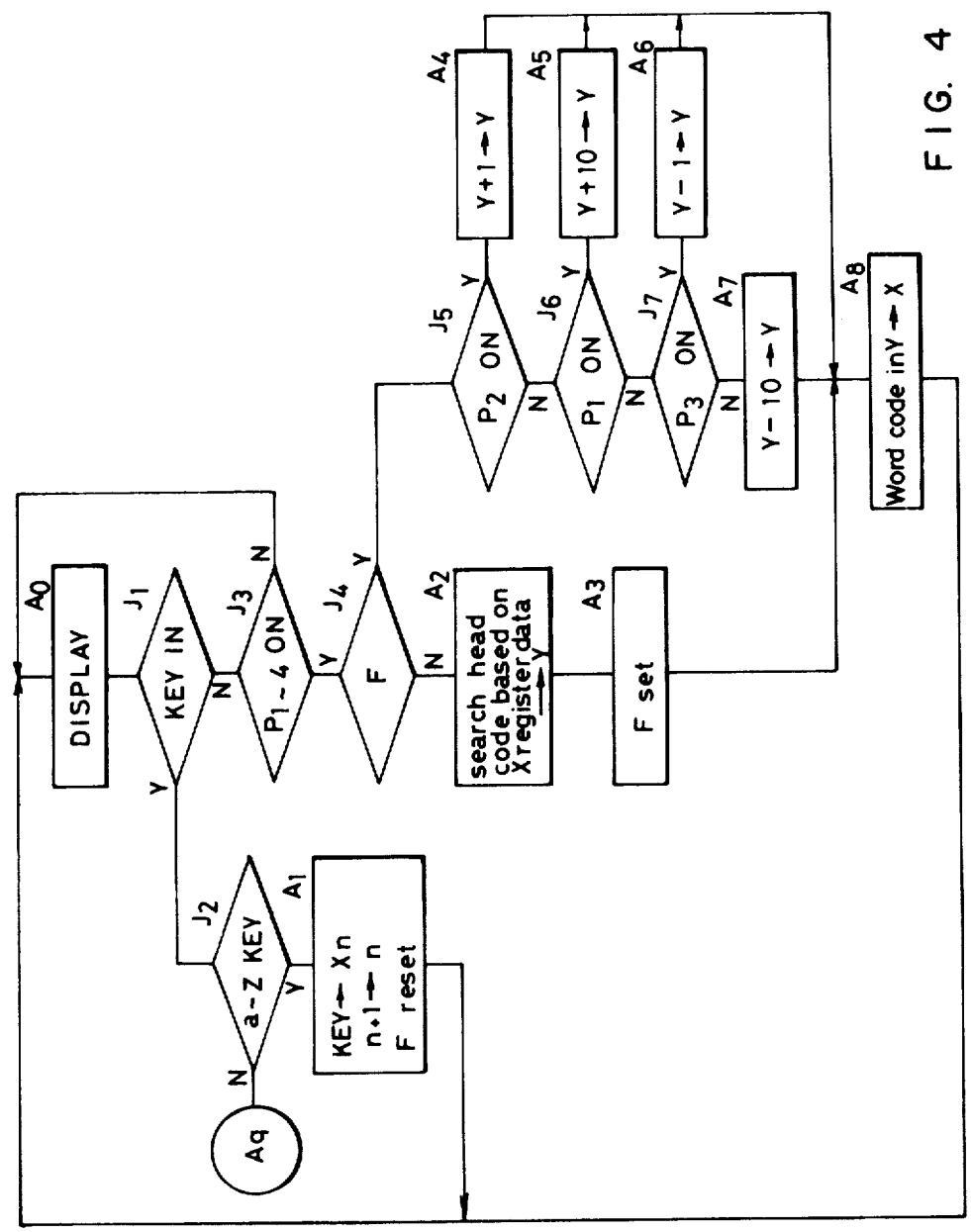
FIG. 4 shows a flow chart representing a retrieval operation of the present invention.

First of all, any language can be applied to an electronic translator of the present invention. An input word is spelled in a specific language to obtain an equivalent word, or a translated word, spelled in a different language corresponding thereto. The languages can be freely selected. According to an example of the present invention, it is assumed that the input language is English and the translated language is Japanese.

Referring now to FIG. 1, there is illustrated an electronic translator according to the present invention. The electronic translator comprises a body A, a display D, a keyboard K, and a search switch B. Preferably, the display D comprises any display such as a light emitting diode (LED), a dot matrix type liquid crystal display (LCD) or the like. The keyboard K contains a plurality of character keys for introducing English alphabetical characters, Japanese "katakanas" or symbols forming entered words, and a plurality of function keys for selecting various functions including translation and retrieval. The search switch B is actuated to control the speed at which word information is retrieved and searched from a memory according to the present invention.

FIG. 2 indicates the operation of the search switch B. The switch B is actuated to select forward retrieval, referred to as "UP" (see FIG. 1), where successive word data is retrieved, and backward retrieval, referred to as "DOWN" (see FIG. 1), where previous word data is retrieved. A finger F stresses the search switch B. The switch B is connectable to a neutral point $P_0$, a slow forward retrieval point $P_2$, a slow backward retrieval point $P_3$, a rapid forward retrieval point $P_1$, and a rapid backward retrieval point $P_4$.

When the finger F exerts a weak pressure on the switch B, the switch B can be connected to either the slow forward retrieval point $P_2$ or the slow backward retrieval point $P_3$, as they are separated from and adjacent to the neutral point $P_0$. When the finger F exerts a strong pressure on the switch B, the switch B can be connected to either the rapid forward retrieval point $P_1$ or the rapid backward retrieval point $P_4$, as they are separated widely from the neutral point $P_0$.

FIG. 3 shows a block diagram of a control circuit implemented within the electronic translator. The control circuit comprises the display D, the keyboard K, the points $P_0$ to $P_4$, an interface circuit IF, a central processing unit (CPU), a RAM, a ROM-A, and a ROM-D.

The CPU is provided for driving the display D, sensing words entered with the keyboard K and sensing one of the points $P_0$ to $P_4$ selected through the interface circuit IF. Further the CPU enables the retrieval of word information, the translation of it, and so on. The ROM-A stores an algorithm for conducting such operations as the retrieval, the translation, and the like. The RAM stores words entered through the keyboard K. The ROM-D stores a plurality of matched pairs of English words and Japanese translated words.

FIG. 4 shows a flow chart representing the retrieval operation of the electronic translator. With reference to FIG. 4, the retrieval operation of each of steps is as follows:

In $A_0$, a display is enabled. In $J_1$, it is detected whether key input operation is being connected. When the key input operation is conducted, in $J_2$ it is detected whether any alphabetical key is operated. When the alphabetical key is not operated, $A_9$ is selected to cause other control operations. When the initial alphabetical key is operated, $A_1$ is selected where the information of the present key input operation, i.e., the initial letter is entered into an X register, the address is counted up to receive the forthcoming key input operation, and a flag F is reset. Following step $A_1$, step $A_0$ is selected to display the word in the English language defined by the code stored in the X register. Step $J_1$ is then selected to detect which alphabetical key has been operated.

In $J_3$, it is detected whether any one of the points $P_1$ to $P_4$ is selected. When any one of them is selected, $J_4$ is selected where the condition of the flag F is detected. As the flag F is reset, $A_2$ is selected. In $A_2$, the head of any word starting with a head spelling on the basis of data stored in the X register is searched. A code of the head word is entered into a Y register. The flag F is set in $A_3$ and $A_8$ is selected. The word (English word) by the code stored in the Y register is transferred into the X register. The word is displayed in $A_0$.

Thereafter, $A_0 \rightarrow J_1 \rightarrow J_3 \rightarrow J_4$ is selected. Since the flag F is set, $J_5$ is selected. During $J_5$ to $J_7$, the retrieval operation of the rapid search or the slow search, and the forward search or the backward search is detected.

When the slow forward retrieval point $P_2$ is selected, $A_4$ is selected so that the contents of the Y register are advanced by one. When the rapid forward retrieval point $P_1$ is selected, $A_5$ is selected where the contents of the Y register are advanced by ten. Similarly, when the backward retrieval is selected, each of $A_6$ and $A_7$ is selected whereby either one or ten is subtracted from the contents of the Y register. In $A_8$, the word of the code stored in the Y register is transferred into the X register so that the word is displayed in $A_0$. The retrieval operation is successively held by repeating the above described operations. When any desired word is displayed, a translation key is operated to retrieve and display or audibilize a translation if a voice synthesizer is provided.

FIG. 5 shows a table representing an example of the retrieval operation where a translation corresponding to the word "legal" is sought.

A letter "l" is entered, firstly, the slow forward retrieval point $P_2$ is selected. The first word starting with the letter "l" is "label" and the code thereof is "101". Then, the code is each advanced by one.

When the rapid forward retrieval point $P_1$ is selected, the code is each advanced by ten while the corresponding words are being displayed. When the code of "153" is selected, the operator recognizes the overrunning. Therefore, the slow backward retrieval point $P_3$ is selected. A word "legate" of a code "152" and a word "legal" of a code "151" are displayed sequentially since one is subtracted from the code each time. When the word "legal" is displayed, the translation key is actuated to display or audibilize the translation.

Needless to say, the search switch B operated for completing the forward, the backward, the rapid and the slow operations can be repaced by a number of switches.

The invention being thus described, it will be obvious that the same may be varied in many ways. Such variations are not to be regarded as a departure from the spirit and scope of the invention, are all such modifications and intended to be included within the scope of the following claims.

What is claimed is:

1. An electronic translator of the type wherein a first word or words represented in a first language are entered to obtain a second word or words represented in a second language equivalent to the first word or words, comprising;
   input means for entering the first word or words;
   memory means for storing the equivalent first and second words;
   access means responsive to the input means for addressing the memory means to cause retrieval of the first word or words;
   retrieval control means for selecting both retrieval speeds and directions for the access means;
   indicating means responsive to the access means for indicating the word or words retrieved from the memory means; and
   translation means for causing the access means to cause the retrieval of the second word or words equivalent to a selected first word or words previously retrieved from the memory means.

2. An electronic translator according to claim 1, wherein the retrieval speeds of the access means selectable by the retrieval control means are rapid and slow.

3. An electronic translator according to claim 2, wherein the retrieval control means provides selection between the slow speed under which each successive first word or words stored in the memory means is sequentially retrieved and the rapid speed under which only those first words stored at a regular interval in the memory means are sequentially retrieved.

4. An electronic translator according to claim 3, wherein the retrieval control means further enables the access means to sequentially address and retrieve first words stored in the memory means in both the predetermined order and in an order opposed to the predetermined order.

5. An electronic translator according to claim 4, wherein the retrieval control means causes retrieval of first words stored at intervals of ten when in the rapid speed.

6. An electronic translator according to claim 4, wherein the first word or words are stored in the memory means in a predetermined order such that it can be ascertained from any first word or words where in the predetermined order that first word or words is located, and wherein the access means is responsive to the entry of the first character in a first word or words in the input means for addressing the memory means at the location in the predetermined order where first words starting with the first character commence being stored.

7. An electronic translator according to claim 6, wherein the predetermined order is alphabetical.

8. An electronic translator according to claim 1, further comprising a switch for selecting the retrieval speeds and directions for the access means.

9. An electronic translator according to claim 1, wherein the retrieval directions for the access means selectable by the retrieval direction control means are forward and backward.

10. An electronic translator according to claim 1, wherein the first word or words are stored in the memory means in a predetermined order such that it can be ascertained from any first word or words where in the predetermined order that first word or words is located, and wherein the access means is responsive to the entry of the first character in a first word or words in the input means for addressing the memory means at the location in the predetermined order where first words starting with the first character commence being stored.

11. An electronic translator according to claim 10, wherein the predetermined order is alphabetical.

12. An electronic translator of the type wherein a first word or words represented in a first language are entered to obtain a second word or words in a second language which are equivalent to the first word or words, comprising:
- input means for entering the first character of a selected one of first word or words;
- memory means for storing the equivalent first and second words, the first word or words being stored in a predetermined order such that it can be ascertained from any first word or words where in the predetermined order that first word or words is located;
- access means responsive to the entry of the first character in the input means for addressing the memory means at the location in the predetermined order where first words starting with the first character commence being stored;
- indicating means responsive to the access means for indicating the word or words being retrieved by the access means;
- variable speed and direction retrieval control means for sequentially causing the access means to retrieve certain of the first words starting with the first character from the memory means and causing each successively retrieved first word or words starting with the first character to be indicated by the indicating means such that the selected first word or words can be retrieved from the memory means; and
- translation means for causing the access means to retrieve the second word or words equivalent to the selected and previously retrieved first word or words and causing the indicating means to indicate the translated second word or words.

13. An electronic translator according to claim 12, wherein the first character of the first word or words entered in the input means is transferred immediately to a register in the access means enabling the access means to address those locations in the memory means where first words starting with the first character are stored.

14. An electronic translator according to claim 13, wherein the predetermined order is alphabetical.

15. An electronic translator according to claim 12, wherein the variable speed and direction retrieval control means further enables the access means to sequentially address and retrieve first words stored in the memory means in both the predetermined order and in an order opposed to the predetermined order.

16. An electronic translator according to claim 15, wherein the variable speed and direction retrieval control means further enables the access means to operate at a plurality of discrete speeds in addressing the memory means.

17. An electronic translator according to claim 16, wherein the retrieval control means enables the access means to operate at two speeds, rapid and slow.

18. An electronic translator according to claim 17, wherein the slow speed permits each successive first word or words stored in the memory means to be sequentially retrieved and the rapid speed permits only those first words stored at a regular interval in the memory means to be sequentially retrieved.

19. An electronic translator according to claim 18, wherein the retrieval control means causes retrieval of first words stored at intervals of ten when in the rapid speed.

20. An electronic translator according to claim 18, wherein the retrieval control means includes a switch for selecting both the retrieval speed and direction.

* * * * *